UNITED STATES PATENT OFFICE.

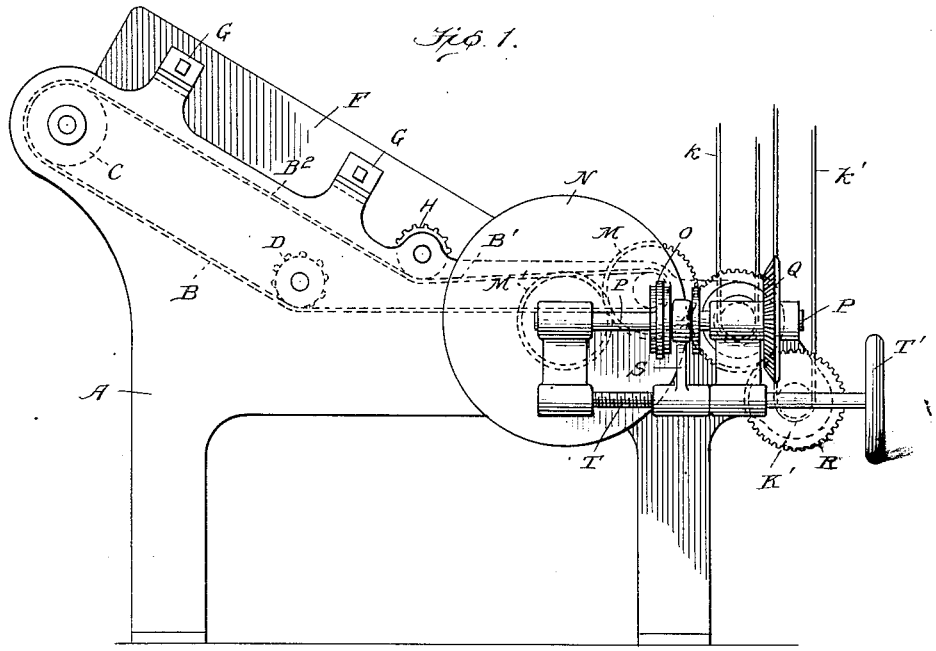
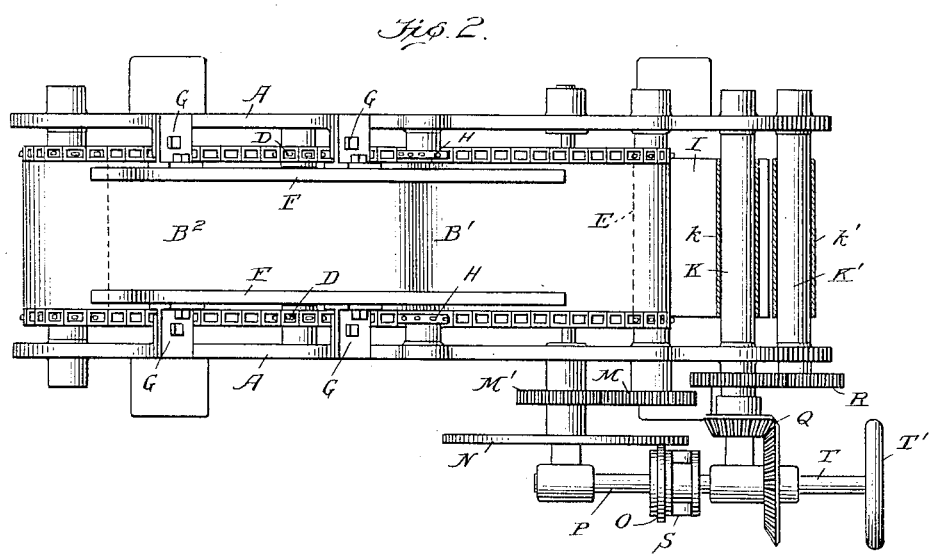

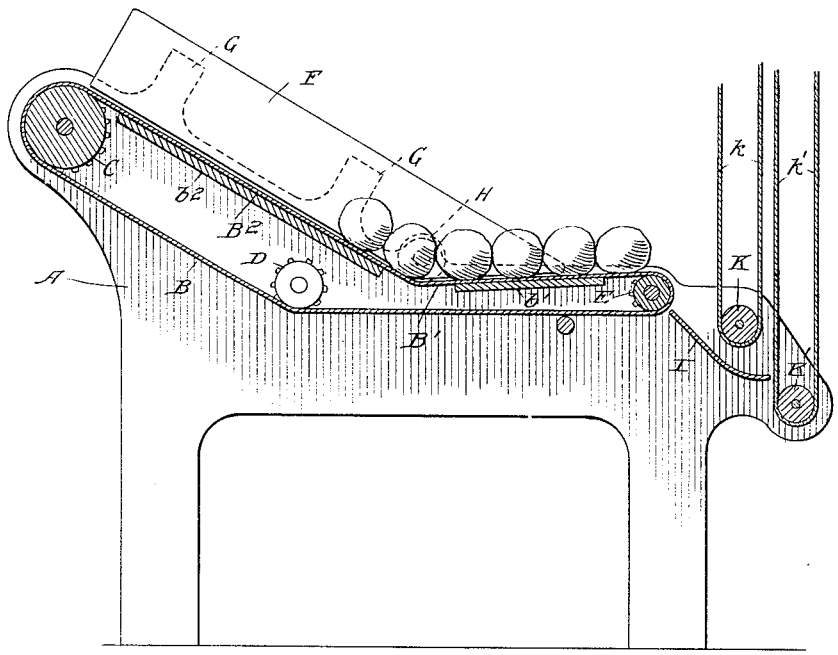

FRANK H. VAN HOUTEN, OF BEACON, NEW YORK, ASSIGNOR TO DUTCHESS TOOL COMPANY, OF BEACON, NEW YORK, A CORPORATION OF NEW YORK.

MACHINE FOR SPACING LUMPS OF DOUGH.

1,333,886.     Specification of Letters Patent.     Patented Mar. 16, 1920.

Application filed October 29, 1918. Serial No. 260,204.

*To all whom it may concern:*

Be it known that I, FRANK H. VAN HOUTEN, a citizen of the United States, residing at Beacon, in the county of Dutchess and State of New York, have invented certain new and useful Improvements in Machines for Spacing Lumps of Dough; and I do hereby declare the following to be a full, clear, and exact description of the same, reference being had to the accompanying drawings, forming part of this specification.

The present invention relates to machines for spacing lumps of dough, and more especially to machines of the type illustrated in my prior Patents Nos. 1,160,791 and 1,160,792, especially when used in connection with the mechanism for elevating the lumps of dough for deposit in a proofer or proving cabinet, such, for example, as that illustrated in my prior Patent No, 1,115,621. Economical and successful handling of lumps of dough in bread making during certain periods of the process, and more especially in the proving process depends largely upon the uniform spacing of the lumps in such wise that their individuality will be retained without danger of coalescence, but without leaving irregular or wide spaces between the lumps. In accomplishing the desired spacing it has usually been customary, as in the machines of the patents before mentioned to assemble the lumps in sequence and in contact with each other on a conveyer such as a traveling belt support, moving at certain definite rate of speed and to remove the lumps from that conveyer by a conveyer moving at a higher rate of speed, the ratio of speed being such as to give the desired spaces between succeeding lumps. I have now discovered that the necessity of employing a second conveyer such as that last above referred to, may be entirely dispensed with and the desired separation attained by permitting the lumps to fall successively and separately by gravity from the conveyer on which they are assembled, and through the medium of a suitable incline guiding the separated lumps into position to be taken away by an elevating mechanism, for example, which will maintain the spaced relation and deposit the lumps at the desired elevation in their travel to the proving cabinet.

Referring to the accompanying drawings,—

Figure 1 is a side elevation of a machine embodying the present improvements;

Fig. 2 is a top plan view of the same; and

Fig. 3 is a section in a longitudinal plane showing some of the assembled lumps of dough in position.

In the machine illustrated in the drawings, a conveyer belt B is mounted to travel around rollers C, D and E, respectively, journaled in suitable bearings of side frames A, one portion of the conveyer belt being adapted to travel in an inclined plane as indicated at $B^2$, while another portion is adapted to travel in a substantially horizontal or slightly upwardly inclined plane as indicated at $B'$, these two portions of the belt being respectively supported against sagging by supporting boards or ways $b^2$ and $b'$. In the preferred construction, the conveyer belt is provided at its edges with sprocket chains or their equivalent adapted to travel over and be guided by sprocket or similar projections on the ends of the rollers, whereby the belt is kept taut transversely and its regularity of movement assured, even though the driving power be transmitted through one only of the roller shafts. The forwardly and downwardly inclined reach $B^2$ of the conveyer, as well as a portion of the forwardly and slightly upwardly inclined reach $B'$ underlie guiding walls F supported by brackets G on the frame, and together with the said walls form a trough-like structure into which the lumps of dough may be passed from the divider or other suitable appliance and down which they will travel partly by gravity and partly by the forward movement of the belt until they are assembled in contact with each other, at the bottom of the downwardly inclined reach and extending along the substantially horizontal or slightly upwardly inclined reach of the conveyer. For maintaining the belt at the proper angle between the two reaches referred to, its edges are adapted to travel under guide rollers H, best seen in Figs. 1 and 2, the operation of this portion of the apparatus, in so far as the assembling of the lumps of dough in orderly sequence and in contact with each other, corresponds to the operation of the machines illustrated in the two patents first hereinbefore referred to. The employment of a conveyer in the form of a single belt, however, without sharp reverse bends therein, is an advantageous one.

At the point where the conveyer passes around the roller E it is adapted to discharge the lumps of dough successively and separately, the discharging action being initially effected by the movement of the belt, but is completed by the action of gravity, whereby the end lump of dough is caused to gradually separate from the next succeeding lump and finally to drop completely clear before the succeeding lump reaches a point where its discharging movement takes place. The falling or discharging lump is received upon an incline I, extending between the side frames of the machine and preferably curved at its lower end into a position to underlie a conveyer belt roller K and to project into proximity with a reach of a second conveyer belt passing around a roller K'. The two belts $k$ and $k'$ passing around the rollers K and K', together form an elevating mechanism, and a lump of dough passing down the incline will be instantly drawn under the roller K into contact with the conveyer belt $k'$ and up between the two belts by which it will be carried to the proper elevation, and this movement will occur before the succeeding lump drops from the assembling conveyer, so that a spaced relation between the lumps is created and is thereafter maintained during the progress of the lumps of dough through the succeeding apparatus employed in the process of bread-making.

For driving the conveyers at the desired speed a mechanism is preferably employed which, while permitting of a variation in the relative speed, nevertheless gears the assembling and elevating belts together in such wise that the desired ratio having been once decided upon and the machine properly set will be maintained until the mechanism is reset for a different ratio. Different size lumps and dough of different consistency may require a different ratio.

The mechanism preferably employed is as follows: The shaft of roller E is provided with a gear wheel M in mesh with a similar gear wheel M' on a second shaft carrying at one end a friction drive disk N. An adjustable friction wheel O slidably keyed to a shaft P bears against the disk N and the shaft P is geared to the elevator belt rollers through bevel gears Q and spur gears R. For adjusting the friction wheel across the face of the disk it is preferably controlled by a shifter S adapted to be moved by a screw shaft T having a suitable hand wheel T', both the shafts P and T being mounted in bearings hung on the ends of shafts mounted in the frame, thus doing away with the necessity of employing frame brackets.

The belts forming the elevator, it will be noted, form a pocket, so to speak, that is to say, one belt extends across the end of the incline to intersect the path of travel of the lumps, while the other belt terminates above the incline or path of travel of the lumps. The effect of this construction is to cause the lumps of dough to be interrupted by one belt and being caught in the pocket each lump in turn will be seized by and fed between the belts and may be carried to any suitable point without danger of the spaced relation being changed.

What is claimed is:

1. In an apparatus for uniformly spacing lumps of dough, the combination with means for advancing the lumps at a uniform rate while in contact or in proximity to each other and from which the lumps drop separately by gravity, an incline for receiving and guiding the falling separated lumps and an elevating mechanism for removing the separated lumps from the incline in spaced relation to each other.

2. In an apparatus for uniformly spacing lumps of dough, the combination with means for assembling and advancing the lumps in contact with each other and from which the lumps drop separately by gravity, an incline for receiving and guiding the falling separated lumps, and means for removing each lump before the succeeding lump drops into contact therewith.

3. In an apparatus for uniformly spacing lumps of dough, the combination with means for advancing the lumps at a uniform rate while in contact with each other and from which the lumps drop separately by gravity, an incline for receiving and guiding the falling separated lumps, a conveyer belt under which the lumps pass on the incline, and a second conveyer belt operating in conjunction with the first mentioned belt to lift the lumps away from the incline.

4. In an apparatus for uniformly spacing lumps of dough, the combination with means for advancing and discharging the lumps at a uniform rate, of a pair of conveyer belts forming an elevator, one of said belts extending perpendicularly across the path of travel of the lumps and the other of said belts terminating above said path of travel whereby each lump will pass under the end of one belt and into contact with the other where it will be seized between the belts.

5. In an apparatus for uniformly spacing lumps of dough, the combination with a means for assembling and advancing the lumps in contact with each other and from which the lumps drop separately by gravity, of an incline for receiving and guiding the falling lumps, and a pair of conveyer belts forming an elevator, one of said belts extending across the end of the incline to intercept the lumps and the other of said belts terminating above the incline to form a pocket in which the lumps will be seized by the belts.

FRANK H. VAN HOUTEN.